United States Patent
Brunn

(10) Patent No.: US 9,940,018 B2
(45) Date of Patent: *Apr. 10, 2018

(54) BOUNDLESS PROJECTED INTERACTIVE VIRTUAL DESKTOP

(71) Applicant: International Business Machines Corporation, Armonk, NY (US)

(72) Inventor: Jonathan F. Brunn, Logan, UT (US)

(73) Assignee: International Business Machines Corporation, Armonk, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/828,563

(22) Filed: Aug. 18, 2015

(65) Prior Publication Data

US 2016/0112688 A1    Apr. 21, 2016

Related U.S. Application Data

(63) Continuation of application No. 14/519,238, filed on Oct. 21, 2014, now Pat. No. 9,710,160.

(51) Int. Cl.
*G06F 1/16* (2006.01)
*G06F 3/0488* (2013.01)
(Continued)

(52) U.S. Cl.
CPC ........ *G06F 3/04886* (2013.01); *G06F 1/1639* (2013.01); *G06F 1/1694* (2013.01);
(Continued)

(58) Field of Classification Search
CPC .... G06F 1/1639; G06F 3/0425; G06F 3/0481; G06F 3/04886; G06F 3/04815; G09G 3/002
See application file for complete search history.

(56) References Cited

U.S. PATENT DOCUMENTS

| 7,967,444 B2 | 6/2011 | Hung et al. |
| 8,013,848 B2 | 9/2011 | Miyazawa |

(Continued)

FOREIGN PATENT DOCUMENTS

| CN | 106687887 A | 5/2017 |
| DE | 112015004280 T5 | 6/2017 |

(Continued)

OTHER PUBLICATIONS

International Searching Authority, "Notification of Transmittal of the International Search Report and the Written Opinion of the International Searching Authority, or the Declaration," Patent Cooperation Treaty, Dec. 15, 2015, 7 Pages, International Application No. PCT/IB2015/057333.

(Continued)

*Primary Examiner* — Shen Shiau
(74) *Attorney, Agent, or Firm* — Patricia B. Feighan

(57) ABSTRACT

A method for creating a boundless projected interactive virtual desktop, wherein the interactive virtual desktop comprises an adjustable image of a projected portion of an area associated with at least one desktop of a computing device is provided. The method may include integrating a projector and a motion sensor into a device. The method may also include capturing at least one of a location, a change in location, a change in direction, or a change in orientation associated with the device. The method may include computing a projected image. The method may also include coordinating the computed projected image across at least one application running in the device. The method may further include projecting a view of a portion of an area associated with the coordinated projected image, wherein the projected view comprises an interactive virtual desktop. The method may additionally include adjusting the projected view based on a criteria.

9 Claims, 6 Drawing Sheets

(51) Int. Cl.
*G06F 3/0481* (2013.01)
*G06F 3/01* (2006.01)
*G06F 3/0484* (2013.01)
*H04N 9/31* (2006.01)
*G06F 3/0485* (2013.01)
*G06F 3/0346* (2013.01)
*G06F 3/042* (2006.01)

(52) U.S. Cl.
CPC ............ *G06F 3/017* (2013.01); *G06F 3/0346* (2013.01); *G06F 3/0485* (2013.01); *G06F 3/04815* (2013.01); *G06F 3/04842* (2013.01); *G06F 3/04883* (2013.01); *H04N 9/3179* (2013.01); *H04N 9/3194* (2013.01); *G06F 3/0425* (2013.01); *G06F 3/0481* (2013.01)

(56) References Cited

U.S. PATENT DOCUMENTS

| | | | |
|---|---|---|---|
| 8,044,966 B1* | 10/2011 | Diamond | H04N 9/31 345/426 |
| 9,559,762 B2 | 1/2017 | Byun et al. | |
| 9,710,160 B2 | 7/2017 | Brunn | |
| 2005/0279922 A1 | 12/2005 | Wittenberg et al. | |
| 2006/0289760 A1 | 12/2006 | Bathiche | |
| 2007/0195294 A1* | 8/2007 | Willey | G03B 21/26 353/119 |
| 2008/0018591 A1* | 1/2008 | Pittel | G06F 1/1616 345/156 |
| 2008/0141049 A1* | 6/2008 | Hassan | G06F 1/3203 713/320 |
| 2009/0147272 A1 | 6/2009 | Gibson et al. | |
| 2009/0207322 A1* | 8/2009 | Mizuuchi | G03B 21/14 348/745 |
| 2010/0067181 A1 | 3/2010 | Bair et al. | |
| 2010/0099458 A1 | 4/2010 | Shin et al. | |
| 2010/0137026 A1* | 6/2010 | Kim | H04N 9/3173 455/556.1 |
| 2010/0265473 A1* | 10/2010 | Yamashita | G02B 26/105 353/85 |
| 2010/0306022 A1 | 12/2010 | Plut | |
| 2011/0197147 A1* | 8/2011 | Fai | G06F 1/1639 715/753 |
| 2012/0019441 A1* | 1/2012 | Ueno | G03B 21/142 345/156 |
| 2012/0069308 A1 | 3/2012 | Satake et al. | |
| 2012/0140096 A1 | 6/2012 | Östlund et al. | |
| 2012/0154756 A1 | 6/2012 | Hung et al. | |
| 2013/0163812 A1 | 6/2013 | Mukasa | |
| 2013/0271370 A1 | 10/2013 | Wang et al. | |
| 2014/0177909 A1 | 6/2014 | Lin et al. | |
| 2015/0268730 A1 | 9/2015 | Walline et al. | |
| 2015/0277566 A1 | 10/2015 | Musgrave et al. | |
| 2016/0110099 A1 | 4/2016 | Brunn | |
| 2016/0238833 A1 | 8/2016 | Okumura | |
| 2016/0269390 A1 | 9/2016 | Endo et al. | |

FOREIGN PATENT DOCUMENTS

| | | |
|---|---|---|
| GB | 2546931 A | 8/2017 |
| JP | 2008203490 A | 9/2008 |
| JP | 4250884 B2 | 4/2009 |
| JP | 20117948 A | 1/2011 |
| JP | 2013524354 A | 6/2013 |
| WO | 2011012168 A1 | 2/2011 |
| WO | 2013078657 A1 | 6/2013 |
| WO | 2016063152 A1 | 4/2016 |

OTHER PUBLICATIONS

Brunn, "Boundless Projected Interactive Virtual Desktop," filed Oct. 21, 2014, p. 1-38, U.S. Appl. No. 14/519,238.
Chang et al., "Deep Shot: A Framework for Migrating Tasks Across Devices Using Mobile Phone Cameras," CHI 2011, May 7-12, 2011, ACM, Vancouver, BC, Canada.
Google, "Racer," Chrome Experiments, May 24, 2013, p. 1, New York, USA, http://www.chromeexperiments.com/detail/racer/?f=, Accessed on: Oct. 17, 2014.
Legend et al., "Happy Together," House of Legend, Feb. 12, 2014, p. 1, GitHub, Inc., https://github.com/houseoflegend/happytogether, Accessed on: Oct. 17, 2014.
Maes et al., "Meet the SixthSense Interaction," TED2009, Feb. 2009, p. 1-3, TED Conferences, LLC, http://www.ted.com/talks/pattie_maes_demos_the_sixth_sense, Accessed on: Sep. 25, 2014.
Muttreja, "Mobile Interfaces using Pico-Projectors—Virtual White Board and SmartPresent," Duke, p. 1-5, http://smarthome.duke.edu/fellow-projects/sound_sense, Accessed on: Sep. 25, 2014.
Wikipedia, "Samsung Galaxy Beam i8520," Last Modified on Apr. 3, 2014, p. 1-2, Wikipedia: the Free Encyclopedia, http://en.wikipedia.org/wiki/Samsung_Beam_i8520, Accessed on: Sep. 25, 2014.
Wikipedia, "Omnitouch," Last Modified on Jun. 6, 2014, p. 1-2, Wikipedia: the Free Encyclopedia, http://en.wikipedia.org/wiki/Omnitouch, Accessed on: Sep. 25, 2014.
Wikipedia, "Skinput," Last Modified on Mar. 25, 2014, p. 1-3, Wikipedia: the Free Encyclopedia, http://en.wikipedia.org/wiki/Skinput, Accessed on: Sep. 25, 2014.
IBM, "List of IBM Patents or Patent Applications Treated as Related (Appendix P)," Sep. 2, 2015, p. 1-2.

* cited by examiner

BOUNDLESS PROJECTED INTERACTIVE VIRTUAL DESKTOP

BACKGROUND

The present invention relates generally to the field of computers, and more particularly to projectors.

A projector or image projector is an optical device that projects an image (or moving images) onto a surface, such as a projection screen. Currently, projectors may be available as a handheld projector (also known as a pocket projector, mobile projector, pico projector or mini beamer). A handheld projector may even be embedded in smartphones. A handheld projector is technology that applies the use of an image projector in a handheld device, such as mobile phones, personal digital assistants, and digital cameras.

SUMMARY

According to one embodiment, a method for creating a boundless projected interactive virtual desktop, wherein the boundless projected interactive virtual desktop comprises an adjustable image of a projected portion of an area associated with at least one desktop of a computing device is provided. The method may include integrating a projector and a motion sensor into a device. The method may also include capturing at least one of a location, a change in location, a change in direction, or a change in orientation associated with the device from the integrated motion sensor. The method may include computing a projected image based on the captured location, the captured change in direction, or the captured change in orientation of the device relative to a projected surface. The method may further include coordinating the computed projected image across at least one application running in the device based on the captured location and an orientation of the projector, wherein the projected image is associated with the projection surface. The method may also include projecting a view of a portion of an area associated with the coordinated projected image, wherein the projected view comprises an interactive virtual desktop including a plurality of elements comprising application images. The method may additionally include adjusting the projected view of the portion of the area based on a criteria.

According to another embodiment, a computer system for creating a boundless projected interactive virtual desktop, wherein the boundless projected interactive virtual desktop comprises an adjustable image of a projected portion of an area associated with at least one desktop of a computing device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include integrating a projector and a motion sensor into a device. The method may also include capturing at least one of a location, a change in location, a change in direction, or a change in orientation associated with the device from the integrated motion sensor. The method may include computing a projected image based on the captured location, the captured change in direction, or the captured change in orientation of the device relative to a projected surface. The method may further include coordinating the computed projected image across at least one application running in the device based on the captured location and an orientation of the projector, wherein the projected image is associated with the projection surface. The method may also include projecting a view of a portion of an area associated with the coordinated projected image, wherein the projected view comprises an interactive virtual desktop including a plurality of elements comprising application images. The method may additionally include adjusting the projected view of the portion of the area based on a criteria.

According to yet another embodiment, a computer program product for creating a boundless projected interactive virtual desktop, wherein the boundless projected interactive virtual desktop comprises an adjustable image of a projected portion of an area associated with at least one desktop of a computing device is provided. The computer program product may include one or more computer-readable storage devices and program instructions stored on at least one of the one or more tangible storage devices, the program instructions executable by a processor.

The computer program product may also include program instructions to integrate a projector and a motion sensor into a device. The computer program product may also include program instructions to capture at least one of a location, a change in location, a change in direction, or a change in orientation associated with the device from the integrated motion sensor. The computer program product may include program instructions to compute a projected image based on the captured location, the captured change in direction, or the captured change in orientation of the device relative to a projected surface. The computer program product may further include program instructions to coordinate the computed projected image across at least one application running in the device based on the captured location and an orientation of the projector, wherein the projected image is associated with the projection surface. The computer program product may also include program instructions to project a view of a portion of an area associated with the coordinated projected image, wherein the projected view comprises an interactive virtual desktop including a plurality of elements comprising application images. The computer program product may additionally include program instructions to adjust the projected view of the portion of the area based on a criteria.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
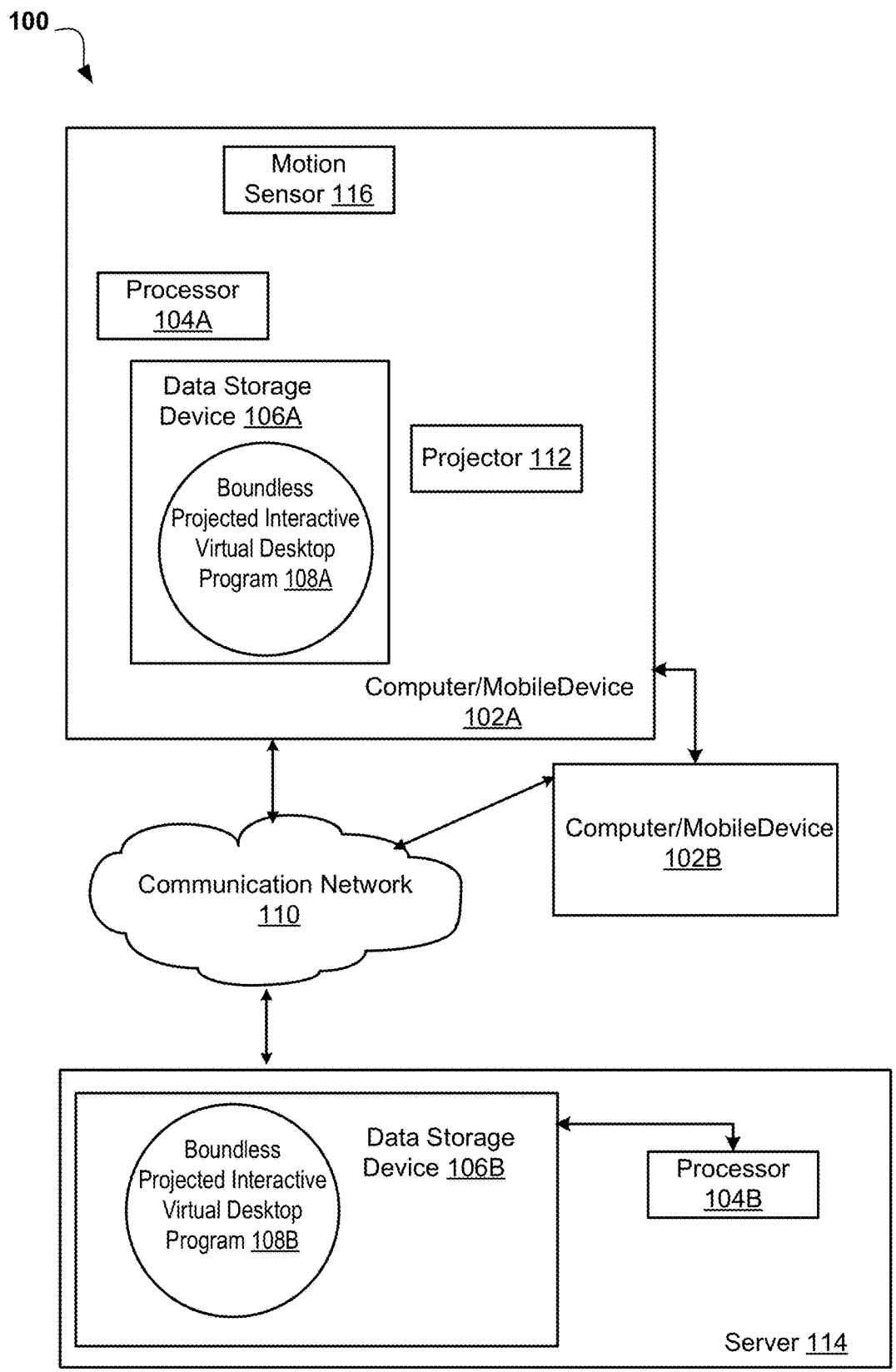
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to projectors. The following described exemplary embodiments provide a system, method and program product to, among other things, provide a boundless projected interactive virtual desktop. Additionally, the present embodiment has the capacity to improve the technical field of image processing by enabling the projection of desktop images of an unbounded surface of a desktop onto a surface. Furthermore, the present embodiment has the potential to conserve resources. As such, battery power will be conserved by the combined adjustment of total lighting and lens adjustment, resulting in a preservation of the luminance at the cost of the projection size.

As previously described, projectors may now be available as handheld or pico projectors and may even be embedded in smartphones which have sufficient storage capacity to handle presentation materials but little space to accommodate an attached display screen. Handheld projectors involve miniaturized hardware and software that can project digital images onto any nearby viewing surface. However, such handheld projectors may not enable a wide user interface, but rather may just provide a mirroring of the screen into a projected surface. Additionally, the current handheld projectors may suffer from high energy usage and therefore, may require frequent recharging of the battery.

Furthermore, a common problem exists with respect to the use of a projector or a standard screen. Users of such devices may struggle with multi-tasking, copying or pasting functions or other interactions which may require being coordinated across applications. For example, complex organization, such as filing a large number of documents may be difficult and may require a user to navigate among many dialogs and choice lists on a small screen. As such, it may be advantageous, among other things, to implement a method of projecting an image that may be panned, scaled, and rotated according to the location and orientation of the device's projector.

According to at least one implementation, the present embodiment may include a projector device that includes a motion sensor, and software that may use the motion sensor in the device to pan, scale, and rotate the projected image as a boundless interactive virtual desktop (i.e., an unbounded interactive virtual desktop) according to the location and orientation of the device's projector. As such, the unbounded interactive virtual desktop is workspace, at least a portion of which, exists only in the memory of the device but of which a bounded area or a portion of a bounded area may be visualized through the projector and in which elements may be moved infinitely in any direction. More specifically, a virtual unbounded desktop is a desktop that has the capacity to have at least a portion of itself exist in memory alone, i.e. at least a portion of it exists in memory and may or may not be displayed or projected on or via a tangible medium. For example, according to at least one implementation of the present embodiment, the position of each element is stored relative to a center position for the desktop, and a representation of a portion of a desktop projected and portrayed as an bounded image or portion of the unbounded area, onto a surface, such as a wall or a desktop. Furthermore, the projected portion of the desktop can be changed based on the detection of a movement associated with the projector device. Therefore, a detected change in movement associated with the projector device corresponds to the surface of the projected portion of the interactive desktop by revealing a previously unrevealed portion of the desktop associated with the projector device. For example, movement of the projected device to the right may reveal a previously projected or unrevealed image associated with the desktop. In one embodiment, the movement to the right, may mimic a "swipe" feature linked to a desktop of a computer screen or mobile device screen. Furthermore, according to various embodiments of the present specification, the projected portion of the desktop may be a projected portion of the desktop associated with the projector device or it may be a projected portion of a desktop associated with a computing device connected to the projector device.

Additionally, two or more projector devices may be used in conjunction with one another to portray a contiguous, larger projected portion of the virtual interactive desktop. For example, the portrayed projected portion of the combined desktops of the projector devices may allow for a larger area of each of the desktops to be portrayed rather than when each projector device is operating in isolation.

Furthermore, a user may interact with the virtual desktop by using gestures, the on screen display, and buttons on the device. For example, as a user moves the projector device containing the motion sensor, the portion of the boundless desktop being projected may be adjusted. For example, movement to the right may portray a different portion of the projected desktop or such movement may include the portrayed portion of the desktop before the movement in addition to portraying the new portion of the projected desktop. Furthermore, the desktop may be capable of displaying a number of "elements", such as documents, images, folders, video, web browser tabs, application windows or applications.

According to at least one implementation, the complete desktop may be viewed on a screen or any large viewing surface, such as a wall. Additionally, by holding the device far from the projection surface, the area illuminated by the projector may be increased, however, the strength of the projection may be decreased, possibly to the point that it is not visible. As such, according to at least one implementation, boundless virtual surface may be created using only a small and relatively low power projector which may be embedded in the device, and may adjust the strength of the projection based on available battery life without sacrificing the effective strength. For example, the user may move the device closer to the surface and, although the illuminated area is then smaller, it may be just as bright with less power consumption in such a situation. Additionally, according to at least one implementation, multiple users may be allowed to interact with the elements simultaneously. Also, the relative size of the projection area may differ depending on the height of the device; however, the location of elements may be preserved relative to the projection surface, not the device.

Various embodiments of the present specification may maintain the projected image fidelity as well as preserve the location of projected elements relative to the projection surface. Additionally, a low power projector may be utilized to illuminate a subsection of a larger augmented reality while providing real-time adjustment of the projected image; real-time adjustment of the projected image based on the motion sensor; coordination of multiple devices interacting with different subsections of a projected virtual desktop; and conservation of battery power by combined adjustment of total lighting and lens adjustment, resulting in a preservation of the luminance at the cost of the projection size. Furthermore, gestures made with the projection device itself may preserve relative positioning on the projected surface while allowing selection, drag and drop and other operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide a boundless projected interactive virtual desktop. Embodiments of the present invention may calculate the projection to take into account a number of variables, all either absolute or relative to a marker. For example, the location of the device may be calculated in three dimensions. As such, the viewing area may be panned and the projection zoomed. Also, the orientation of the device may be calculated in three dimensions so that the image of the viewing area may be stretched and distorted as if the device was flat. Furthermore, the placement of the objects on the surface may be calculated. As such, an object placed on the surface may be detected by a camera or a camera array, either built into or supplemental to the main device. Then, the image may be corrected so that the image may not be magnified by being closer to the device when the object is placed between the surface and the device. Additionally, to further improve the accuracy, the device may be used in conjunction with table mounted cameras or other sensors (such as an array of infrared light (IR) devices) capable of pinpointing the location and position of the device in three dimension.

Implementations of the present embodiment may also allow for user interaction. For example, a series of gestures may be made with the device itself to select and interact with elements on the tabletop. Some of the main interactions involve picking up and dropping items, and using the device screen and gestures to interact with the device. In particular, a user may flick the device forward to put an item down (which may create a stack); flick it up to pick up an item from the tabletop; or flick it to the side to shuffle through a stack. As the device is moved, the movement may be tracked through motion sensors in the device. Such motion sensors may detect surfaces nearby or such motion sensors may interact with devices on or near the surface. According to at least one implementation, the projected image may be recalculated to represent the area of the image which corresponds to that part of the surface, and potentially skewed and stretched using existing technology to account for the angle of the device relative to the surface(s). Additionally, a user may also pick up a single multiple page element, such as a book or document and then use a flick to the side to move through the pages of the document.

Various embodiments of the present specification may also allow for object pinning. As such, virtual objects may be pinned to physical objects to create hybrid stacks. For example, a virtual element placed "on" a coaster on the real tabletop may move when the coaster is moved. An element, such as a document, photo or video that is placed on a real sheet of paper may move with the real paper as if it is in a stack of paper. As such, the stacks may be moved when in view or out of view of the camera. According to at least one implementation, if the physical items are out of view of the camera, the device may first recognize and record their new locations when the physical objects are first observed in a new location. However, if the old location is viewed by the camera before the new location is located, the stack may be placed in a virtual "bin" temporarily until the location can be reassigned. Then, the users may sort through the bins and stacks on their device independent of their physical locations in a stack and bin view and may use this view to further organize documents even once they have left the location of the tabletop. As such, a tabletop may be saved and recreated in a new location. To facilitate this, the user may take a bin (i.e., any stack whose physical pin or counterpart is not yet found) and place it on the table in a new location.

According to at least one implementation, the present embodiment may allow for on screen interaction. Therefore, when the device is pointed at an element on the table but no element is "in hand" or picked up yet, the element being pointed to or a representation of that element, such as a specific icon may be displayed on the device. Then the user may interact with the element on screen. For example, the user may interact with the element by editing it, reading it, or navigating within that element. When a user picks up an element, the element is "locked" to the screen until the user puts the element down or uses other on screen navigation to move away from it. Additionally, a display on the device screen may allow for further interaction with elements and stacks by listing elements, stacks, and elements not in a stack and allowing operations on the elements and stacks. Furthermore, the on screen display may appear when the device is not pointed at an element or when a button is pressed on the device or a special gesture made. The present embodiment may allow a stack to be converted to or added to a folder, collection or set in an online document or content management system or file system using gestures or the on screen display. For example, an entire table may be converted to a library or set of folders with a single action, mirroring the tabletop organization in a content management or file system. A stack may be added to a folder so further items in the stack will be added to the folder automatically and a stack may be linked to a folder so items in the folder may automatically get added to the stack. All actions on the on screen display may be taken with gestures and the device may allow for customization, such as assigning gestures to actions and programming of new gestures.

According to the present embodiment, a device itself may be handheld, wearable or implantable and can include a projector, motion sensor, on screen display and specialized software. These may be physically separated into different modules working together in various implementations. Furthermore, the present embodiment may allow for luminance adjustment. As such, the projector may also include lenses which may be used not only to focus the projection, but to downsize or upside the area of projection while preserving luminance. Using this mechanism, the illuminated area may be reduced by reducing the overall lighting strength from the device without reducing luminance. This luminance adjustment may be used to preserve battery life or to keep the luminance constant as the device is moved closer or farther from the device.

Additionally, multiple users who are each using the present embodiment, may all simultaneously interact with the elements on the virtual tabletop. When an element is modified the modifications may be communicated through near field communication, through a server or cloud service or through network communication between the devices. As such, multiple devices may interact either with radio antenna or other positioning sensors to improve their position and orientation relative to each other. As the projection areas become close and overlap, cameras on the devices may be used to improve the accuracy of device location and orientation detection by monitoring the image projected by the other devices relative to the representation of the tabletop in memory. Additionally, visual tokens or elements outside of the human visual spectrum may be embedded in the projection to assist multiple devices coordinating their projections.

Referring now to FIG. 1, an exemplary networked computer environment 100 in accordance with one embodiment is depicted. The computer environment 100 may include a computer 102A, 102B with a processor 104A and a data storage device 106A that is enabled to run a Boundless Projected Interactive Virtual Desktop program 108A. According to at least one implementation of the present embodiment, the computer 102A, 102B may also include a motion sensor 116 and a projector 112. The motion sensor 116 may include any mechanism to capture the relative motion of the device. Additionally, according to at least one implementation of the present embodiment, the motion sensor 116 may be capable of detecting the position of the device 102A, 102B at one point in time, and then the position of the device 102A, 102B at a later point in time. Furthermore, according to an alternate implementation, in addition to a motion sensor 116, which may aide with movement of the device relative to the surface, the device 102A, 102B may use techniques from using either an active or a passive autofocus detection system (such as contrast or phase detection) to detect the relative angle of the plane of the projected surface relative to the device. As such, multiple points can be sampled for optimal focus, deriving the distance to multiple points in the plane of projection and therefore may allow for the computation of the distance to multiple points and recreation of the plane's geometric in the device's memory.

The networked computer environment 100 may also include a communication network 110 and a server 114 with a processor 104B and a data storage device 106B that is enabled to run a Boundless Projected Interactive Virtual Desktop program 108B. The networked computer environment 100 may include a plurality of computers 102A, 102B and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented.

As will be discussed with reference to FIG. 6, client computer 102A, 102B and server 114 may include internal components 800 and external components 900, respectively. Client computer 102A, 102B may be, for example, a mobile device, a telephone, a personal digital assistant, a netbook, a laptop computer, a tablet computer, a desktop computer, a server computer, or any type of computing device capable of running a program, such as a Boundless Projected Interactive Virtual Desktop program 108A.

A program, such as the Boundless Projected Interactive Virtual Desktop program 108A, 108B may run on the client computer 102A, 102B or server computer 114. As previously described, the boundless projected interactive system may include a projector 112 and a motion sensor 116 integrated into a mobile device, such as client computer 102A, 102B that includes software, such as the Boundless Projected Interactive Virtual Desktop program 108A. The Boundless Projected Interactive Virtual Desktop program 108A, 108B may use the motion sensor 116 in the device 102A, 102B to pan, scale, and rotate the projected image as a boundless virtual desktop according to the location and orientation of the device's projector. Additionally, a user may interact with the projected virtual desktop by using gestures, the on screen display, and buttons on the device 102A, 102B. For example, as a user may move the projector device 102A, 102B containing the motion sensor 116, the portion of the boundless desktop being projected may be adjusted. Furthermore, the desktop may be capable of displaying a number of "elements", such as documents, images, folders, video, web browser tabs, application windows or applications. The Boundless Projected Interactive Virtual Desktop method is explained in further detail below with respect to FIG. 2.

Figure 2:
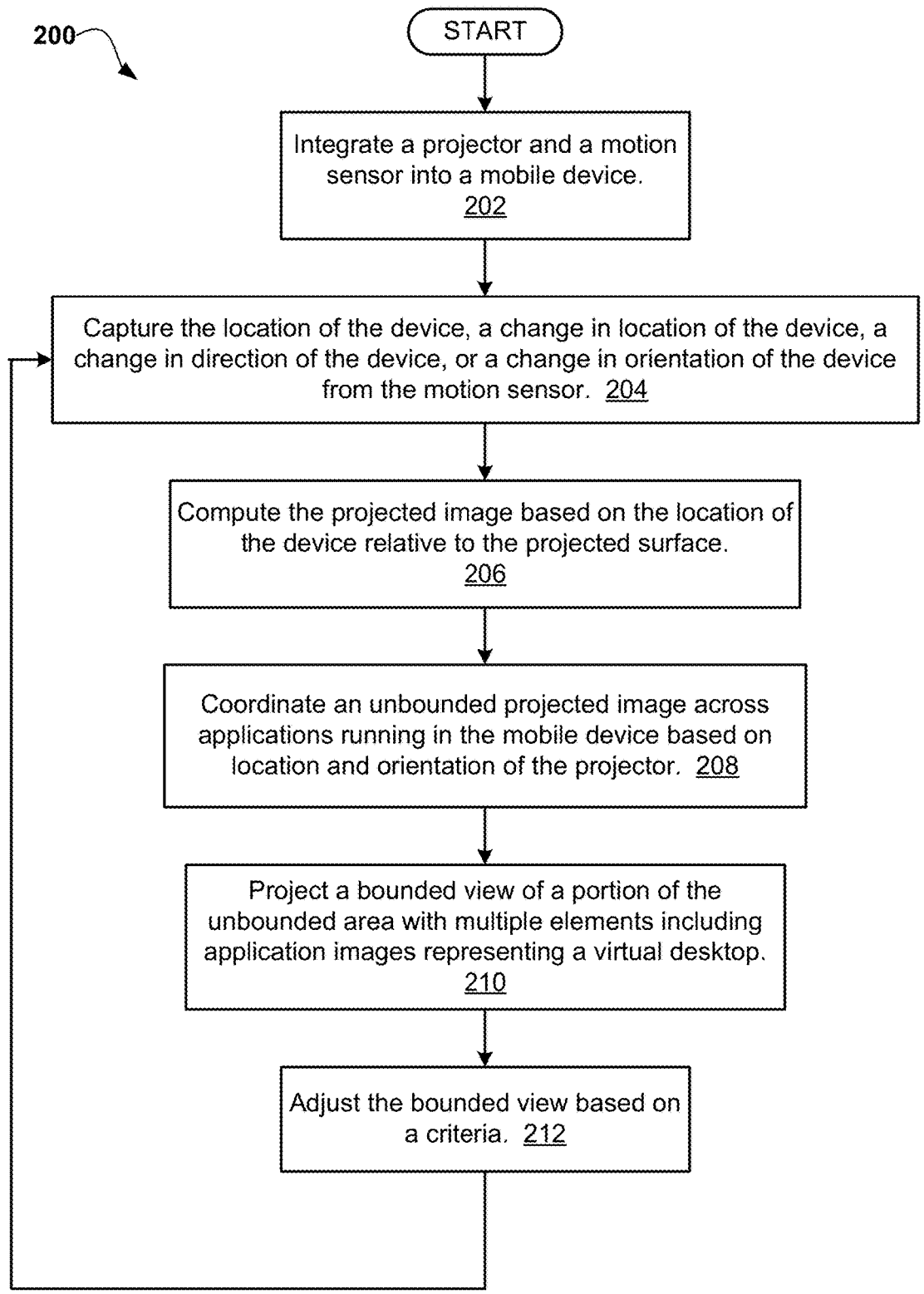
FIG. 2 is an operational flowchart illustrating the steps carried out by a program for projecting a boundless interactive virtual desktop according to at least one embodiment.

Referring now to FIG. 2, an operational flowchart 200 illustrating the steps carried out by a program for projecting a boundless interactive virtual desktop according to at least one embodiment is depicted. At 202, a projector and a motion sensor are integrated into a mobile device. The Boundless Projected Interactive Virtual Desktop program, 108A, 108B (FIG. 1) may be implemented as running on a client computer 102A, 102B (FIG. 1). As previously described, the Boundless Projected Interactive Virtual Desktop system may include a projector 112 (FIG. 1) and a motion sensor 116 (FIG. 1), integrated in a device, such as, but not limited to an End User mobile device 102B (FIG. 1), a computer 102A (FIG. 1) a smartphone, or a tablet that includes a motion sensor 116 (FIG. 1). The Boundless Projected Interactive Virtual Desktop system may also include software, such as the Boundless Projected Interactive Virtual Desktop program 108A, 108B (FIG. 1) that may use the motion sensor 116 (FIG. 1) in the device to pan, scale, and rotate the projected image as a boundless virtual desktop according to the location and orientation of the device's projector 112 (FIG. 1). For example, as a user may move the projector device 102A, 102B (FIG. 1) containing the motion sensor 116 (FIG. 1), the portion of the boundless desktop being projected may be adjusted.

Next at 204, the location of the device is captured from the motion sensor which includes capturing a change in location, direction, or orientation. As such, the Boundless Projected Interactive Virtual Desktop program 108A, 108B (FIG. 1) can determine the location of the device based on the motion sensor that is integrated in the device. However, according to an alternate implementation, the motion sensor may be implemented as software interpreting images being captured from a camera attached to the projector device as opposed to the motion sensor being implemented as a physical piece of hardware integrated in the projector device. Additionally, an infrared wave point may be used on the projected surface in accordance with an alternate implementation. As such, an infrared wave point may be implemented on the projected surface so that the projector device, either through a camera or an infrared sensor, may be able to determine where the projector device is located with respect to the fixed point noted by the infrared wave point. Furthermore, the motion sensor may be selected from a group consisting of an embedded accelerometer; a gyroscope; a positioning system; and an embedded or external electromagnetic or ultrasonic motion sensor.

Then at 206, the projected image is computed (i.e., calculated) based on the location of the device relative to the projected surface. As previously described with respect to one implementation, the projection of the image may be calculated by the Boundless Projected Interactive Virtual Desktop program 108A, 108B (FIG. 1) to take into account a number of variables, either absolute or relative to a marker, such as the projected surface. For example, variables may include the location of the device in three dimensions; the orientation of the device in three dimensions; and placement of objects on the surface. Using basic three dimensional geometry, the dimensions of the projected image can be computed by extending a cone or pyramid from the projector to the surface. The outer dimensions of the projection are calculated and the projected image is adjusted to project a corresponding portion of the boundless desktop.

Therefore, based on such variables, the viewing area may be panned and the projection zoomed by the Boundless Projected Interactive Virtual Desktop program 108A, 108B (FIG. 1). Also, the image of the viewing area may be stretched and distorted as if the device was flat. Furthermore, an object placed on the surface may be detected and then, the image may be corrected so that the image may not be magnified by being closer to the device when the object is placed between the surface and the device. Additionally, to further improve the accuracy, the device 102A, 102B (FIG. 1) may be used in conjunction with table mounted cameras or other sensors (such as an array of infrared light (IR) devices) capable of pinpointing the location and position of the device in three dimension.

Next at 208, an unbounded projected image is coordinated across applications running in the mobile device based on the location and orientation of the projector. As such, each window or element on the desktop is positioned with regard to a center reference point. According to one implementation of the present embodiment, the coordination of the unbounded projected image across at least one application running in the mobile device may be based on the captured location and an orientation of the projector. Additionally, the strength associated with the image projection may be based on a distance of the projector to the projection surface.

Then at 210, a bounded view of a portion of the unbounded area is projected. The projected bounded view may consist of multiple elements including application images representing a virtual desktop. According to at least one implementation, the bounded view may preserve a position and size of elements in the bounded projection relative to the projection surface by making adjustments to the calculation of the bounded view. Furthermore, the elements may be selected from a group including documents, images, folders, videos, web browser tabs, application windows, and an application icons.

Next at 212, the bounded view is adjusted based on a criteria. According to one implementation of present embodiment, the criteria that may be used to adjust the bounded view may include a set of rules. The rules may be based on elements such as, but not limited to, power consumption; distance to a projection surface; motion; image fidelity; outside light or ambient light; tilt or angle of the device relative to the surface; and information received from at least one other device. The primary adjustments to the view keep elements in the projected image at a constant location, orientation and perspective relative to the projected surface in spite of any movement of the projecting device in spite of movement of the device. Power consumption and remaining power is monitored and the image is adjusted corresponding to adjustments in lumen output and projection zoom as described later, keeping the position of elements relative to the surface while adjusting lamp output and zoom to decrease or increase the size of the viewing area.

Additionally, the present embodiment may provide a user interface (UI), whereby the user interface (UI) may allow one or more users to use at least two separate devices to act on the elements independently. For example, the user interface (UI) may allow at least two users to act on the elements independently while each user is using their own separate device. Also, the user interface (UI) associated with the boundless projected interactive virtual desktop may support gestures selected from a group of gestures. The group may consist of gestures such as drag; pick up; drop; pin; and navigate, etc. For example, as a user moves the projector device containing the motion sensor, the portion of the boundless desktop being projected may be adjusted. As previously described, a user may flick the device forward to put an item down (which may create a stack); flick it up to pick up an item from the tabletop; or flick it to the side to shuffle through a stack. As the device is moved, the movement may be tracked through motion sensors in the device. According to at least one implementation, after the bounded view is adjusted based on the criteria, the method may continue in a loop back to step 204, previously described, to capture the location of the device from the motion sensor and repeat the process described with respect to steps 206-212.

It may be appreciated that FIG. 2 provides only an illustration of one implementation and does not imply any limitations with regard to how different embodiments may be implemented. Many modifications to the depicted environments may be made based on design and implementation requirements. For example, as previously described with respect to an alternate implementation, the motion sensor may be implemented as software interpreting images being captured from a camera attached to the projector device as opposed to the motion sensor being implemented as a physical piece of hardware integrated in the projector device. Additionally, an infrared wave point may be used on the projected surface in accordance with an alternate implementation. Also, as previously described, in addition to a motion sensor 116 (FIG. 1), which may aide with movement of the device relative to the surface, the device 102A, 102B (FIG. 1) may use techniques from using either active or passive autofocus detection to detect the relative angle of the plane of the projected surface relative to the device. As such, multiple points can be sampled for optimal focus, deriving the distance to multiple points in the plane of projection and therefore, may allow for the computation of the distance to multiple points and recreation of the plane's geometric in the device's memory.

Figure 3:
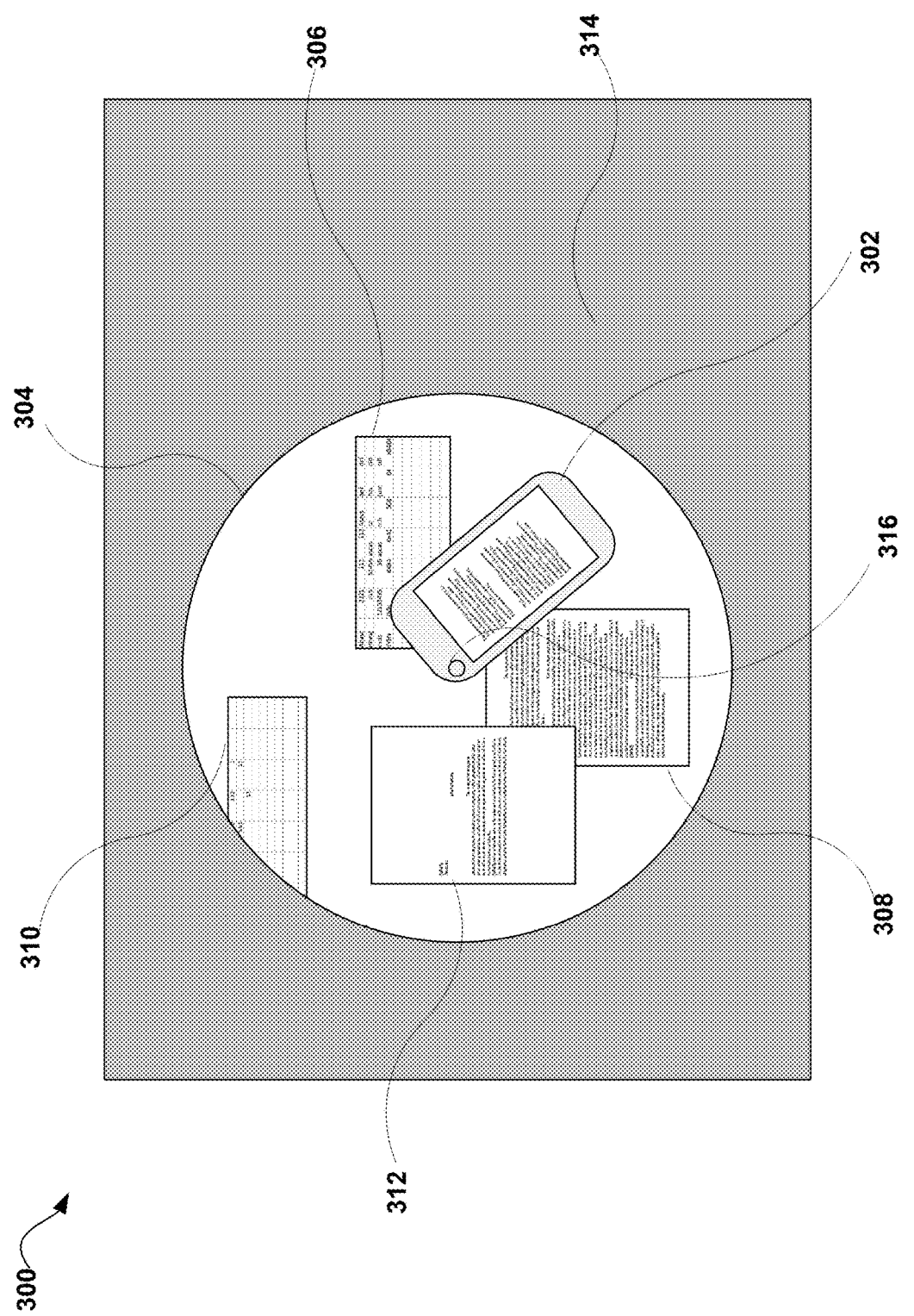
FIG. 3 is an exemplary illustration of the projected desktop image according to at least one embodiment.

Referring now to FIG. 3, an exemplary illustration 300 of the projected desktop image according to at least one implementation of the present embodiment is depicted. As previously described, a user may use a projector device 302 that includes a motion sensor 116 (FIG. 1), a projector 112 (FIG. 1) and software 108A, 108B (FIG. 1) that may use the motion sensor 116 (FIG. 1) in the device 302 to pan, scale, and rotate the projected image as a bounded view (i.e., a portion) of the overall virtual desktop 304 created according to the location and orientation of the device's 302 projector 112 (FIG. 1). For example, according to at least one implementation of the present embodiment, a "snapshot" of a computer screen may be projected and portrayed as an image 304 onto a surface, such as a wall or a desktop. Together, all the areas projected form a virtual desktop 304. The virtual desktop 304 is capable of displaying a number of "elements" 306-312 which may include documents, images, folders, video, web browser tabs, application windows or applications. For illustration purposes only, the projected area 304 is shown as a circle, however, it may be portrayed as another shape, such as a rectangle or a square.

A user using the projector device 302, may interact with the projected virtual desktop 304 by using gestures, the on screen display, and buttons on the device 302. For example, as a user moves the projector device 302 containing the motion sensor, the portion of the desktop being projected 304 may be adjusted. For example, movement to the right may portray a different portion of the projected desktop 304 or such movement may include the portrayed portion of the desktop 304 before the movement in addition to portraying the new portion of the projected desktop 304.

For illustration purposes, the area outside 314 the virtual desktop 304 may depict an area of display which is not visible to a user since it is not currently being projected. However, this area 314 may be represented inside the projector device 302 and may be revealed by moving the projector device 302. Additionally, the dot 316 portrayed at the top of the projector device 302 represents the location of the projector on the device for illustrative purposes.

Figure 4:
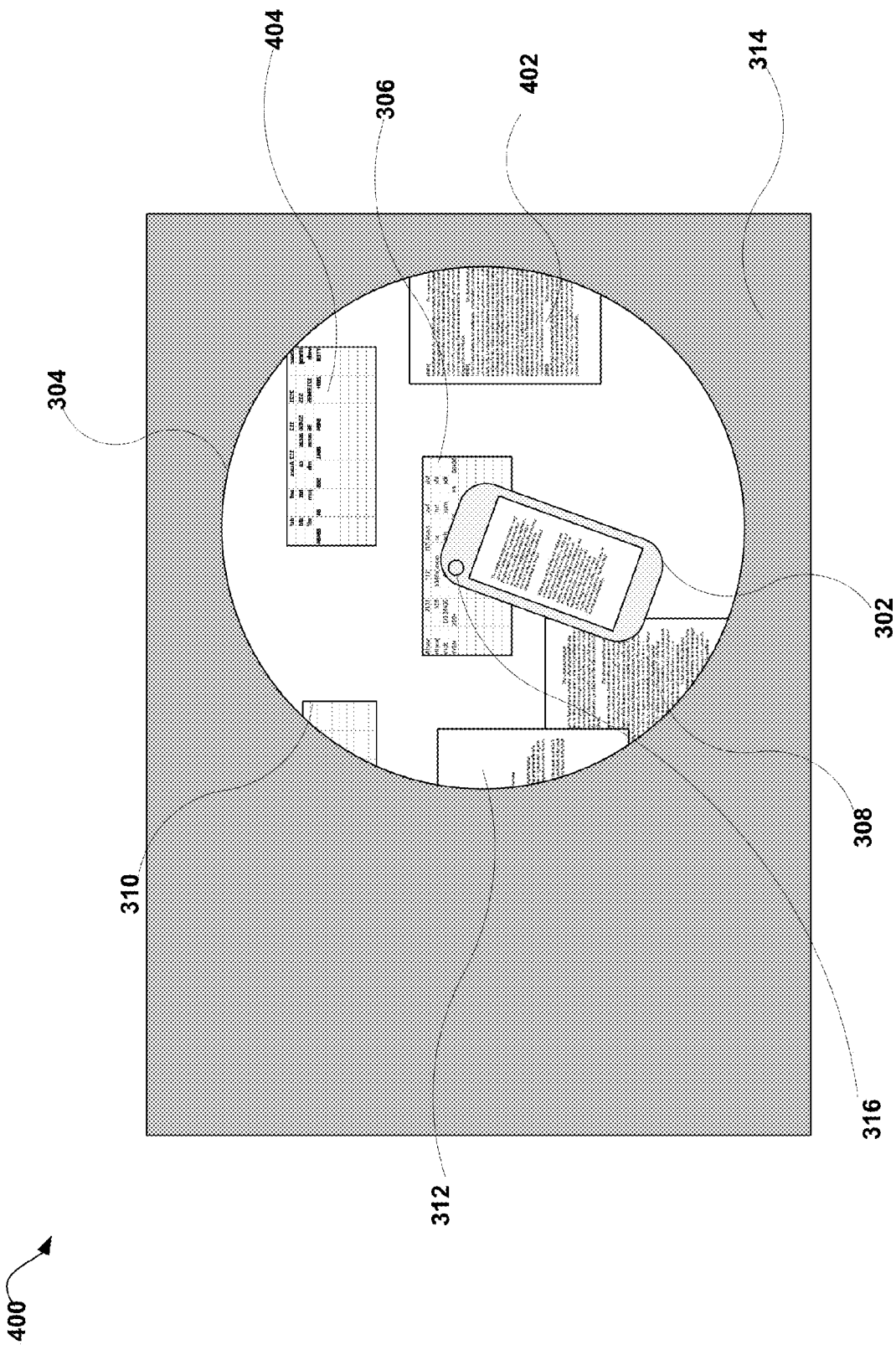
FIG. 4 is an exemplary illustration of movement of the device adjusting the projected desktop image according to at least one embodiment.

Referring now to FIG. 4, an exemplary illustration 400 of movement of the device adjusting the projected desktop image according to at least one embodiment is depicted. As previously described, as a user moves the projector device 302, the portion of the desktop being projected 304 is adjusted. For example, movement of the projector device 302 to the right may portray a different portion of the projected desktop 304 or such movement may include the portrayed portion of the desktop 304 before the movement in addition to portraying the new portion of the projected desktop 304. Therefore, movement of the projector device 302 may result in the location of the previously displayed "elements" 306-312, such as documents, images, folders, video, web browser tabs, application windows or applications may be adjusted with respect to the portrayed portion of the desktop 304 and new "elements" 402-404 may be displayed. Furthermore, as portrayed in FIG. 4, movement of the projector device 302 may adjust the position of the portrayed portion of the projected desktop relative to the surface 314 upon which the projected desktop image is being displayed.

Furthermore, the present embodiment may be able to create a virtual surface 314 using only a small and relatively low power projector which may be embedded in the device 302, and may adjust the strength of the projection based on available battery life without sacrificing the effective strength. For example, the user may move the device 302 closer to the surface and, although the illuminated area is then smaller, it may be just as bright with less power consumption in such a situation. As such, battery power will be conserved by the combined adjustment of total lighting and lens adjustment, resulting in a preservation of the luminance at the cost of the projection size.

Additionally, according to at least one implementation, when doubling the distance of a projector 112 (FIG. 1) in a device 302 to the surface 314, the surface area 314 of the projected image 304 will quadruple (by doubling in each dimension) assuming the projector 112 (FIG. 1) uses the projector's 112 (FIG. 1) full area. Assuming constant lumen output from the projector 112 (FIG. 1), the lux (lumens per square meter) of the projected image will be one fourth for each doubling in distance. As long as there is sufficient stored power available as determined by the projected lifetime of the current battery charge and the users settings or current use, the present embodiment may increase the lumen output from the light source of the projector 112 (FIG. 1) in response to the movement of the device 302 from the projector surface 314, with the intention of maintaining a constant lux. For instance, ignoring variable transmittance of light through the projector 112 (FIG. 1) resulting from a different composition of output wavelengths at different dimming ratios, the projector 112 (FIG. 1) may quadruple the lumen output for a doubling in distance of the device 302 to the surface 314.

Furthermore, the device 302 may reduce power consumption while maintaining constant lux by reducing the surface area 314 of the projection, while also maintaining the size of elements 306-312 in the projected image 304 relative to the surface 314, allowing for an easy to view desktop even in higher light conditions with high battery conservation. In one embodiment, a liquid crystal on silicon (LCoS) pico-projector is used where the lumens emitted from the light source or lamp are varied in conjunction a lens array used to focus the light source to achieve a constant size of projection relative to the surface 314. When power conservation is required, the present embodiment may automatically reduce the size of the projected surface or focus the light source by optical elements focusing the total lumens of the light source over a smaller projected area 304, while coordinating dimming to the light source. For instance, with an LED as a light source to power a digital light processing (DLP) or liquid crystal on silicon (LCoS), the input power to the light source may be dimmed using existing LED dimming techniques. The reduction in the area of the projection 304 is coordinated with a reduction in the lumen output to achieve a constant lux over the projected image. Normally, this alone would result in simply a smaller image being projected onto the surface. For instance, a document shown on the projected surface 314 would appear half the size for each half reduction in the projected image 304 size. The present embodiment recalculates the image to be projected, adjusting the mapping of the desktop to the projector's image producing elements, effectively projecting a smaller area of the original image directly in relation to the reduction in projected image size, and preserving the overall relationship of the projected object to the surface 314. The result for the end user is simply seeing less of the desktop projected 304 instead of seeing a smaller or dimmer image as battery conservation is determined to be more critical.

Figure 5:
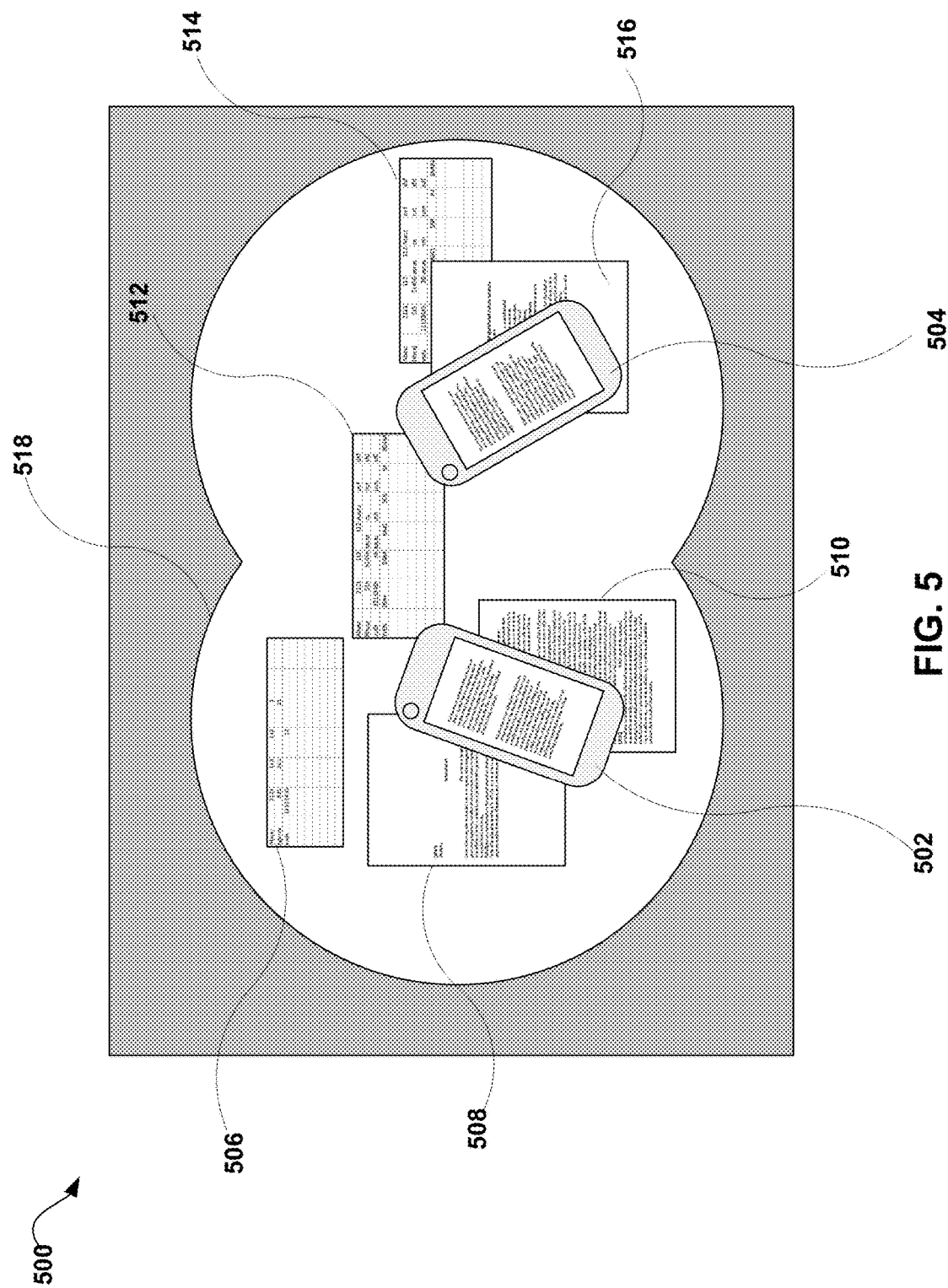
FIG. 5 is an exemplary illustration of coordination of multiple devices interacting with different subsections of the projected desktop image according to at least one embodiment.

Referring now to FIG. 5, an exemplary illustration 500 of coordination of multiple devices interacting with different subsections of the projected desktop image according to at least one embodiment is depicted. According to at least one implementation, the present embodiment may allow at least one user to use different projector devices 502, 504 to interact with the elements of the virtual desktop simultaneously; for example, multiple users, using different projector devices 502, 504 to interact with the elements of the virtual desktop 518 simultaneously. As such, when an element 506-516 is modified, the modifications may be communicated through near field communication, through a server, such as server 114 (FIG. 1), cloud service or through network communication 110 (FIG. 1) between the devices 502, 504. As such, multiple devices 502, 504 may interact either with radio antenna or other positioning sensors to improve their position and orientation relative to each other. As the projection areas become close and overlap, cameras on the devices 502, 504 may be used to improve the accuracy of device location and orientation detection by monitoring the image projected by the other devices 502, 504 relative to the representation of the tabletop in memory. Additionally, visual tokens or elements outside of the human visual spectrum may be embedded in the projection to assist multiple devices 502, 504 coordinating their projections.

The bounds for areas of projection (or device 502, 504 positions, orientations and projector configuration from which areas of projection may be calculated) are communicated over near-field communication, including RFID, Bluetooth or communicated through a computer network. Alternatively, each device 502, 504 may independently detect the projected images 518 of other devices 502, 504 through the use of cameras, including cameras or detectors outside the field of human vision. Once an overlap in projected images 518 from multiple devices 502, 504 are detected by any device 502, 504, several power control and coordination mechanisms are used. A single device 502, 504 may independently reduce or eliminate the output from its projector light source if the device's 502, 504 projected image has significant overlap with the projection from another device 502, 504. The device 502, 504 may coordinate this reduction in output with other devices 502, 504 through all the communication methods listed above, sending messages and possibly allowing for confirmation. Devices 502, 504 may send power usage and remaining power statistics to allow other devices 502, 504 involved with the projection to confirm power reduction strategies, or all data may be sent to a networked device 502, 504 such as a server 114 (FIG. 1) which issues commands to the devices 502, 504. In the case of a laser beam steering approach (LBS) projector, the laser may be steered so as to skip pixels in the overlapping areas of projection, either by turning off when focused on those pixels, or by steering around those areas. To maintain a constant frequency or refresh rate to the overall projection, if the laser is steered around the overlapping areas, the laser may be turned off for a time corresponding to the amount of time reduced within a cycle by steering around certain pixels or areas of the projection. In a lamp based solution such as liquid crystal on silicone (LCoS) or digital light processing (DLP), the device may reduce or turn off the projector's lamp if there is overlap in the projected areas. The threshold for the overlap required before these techniques are employed may be configured and may be dependent on the remaining power and power usage of the devices involved.

Figure 6:
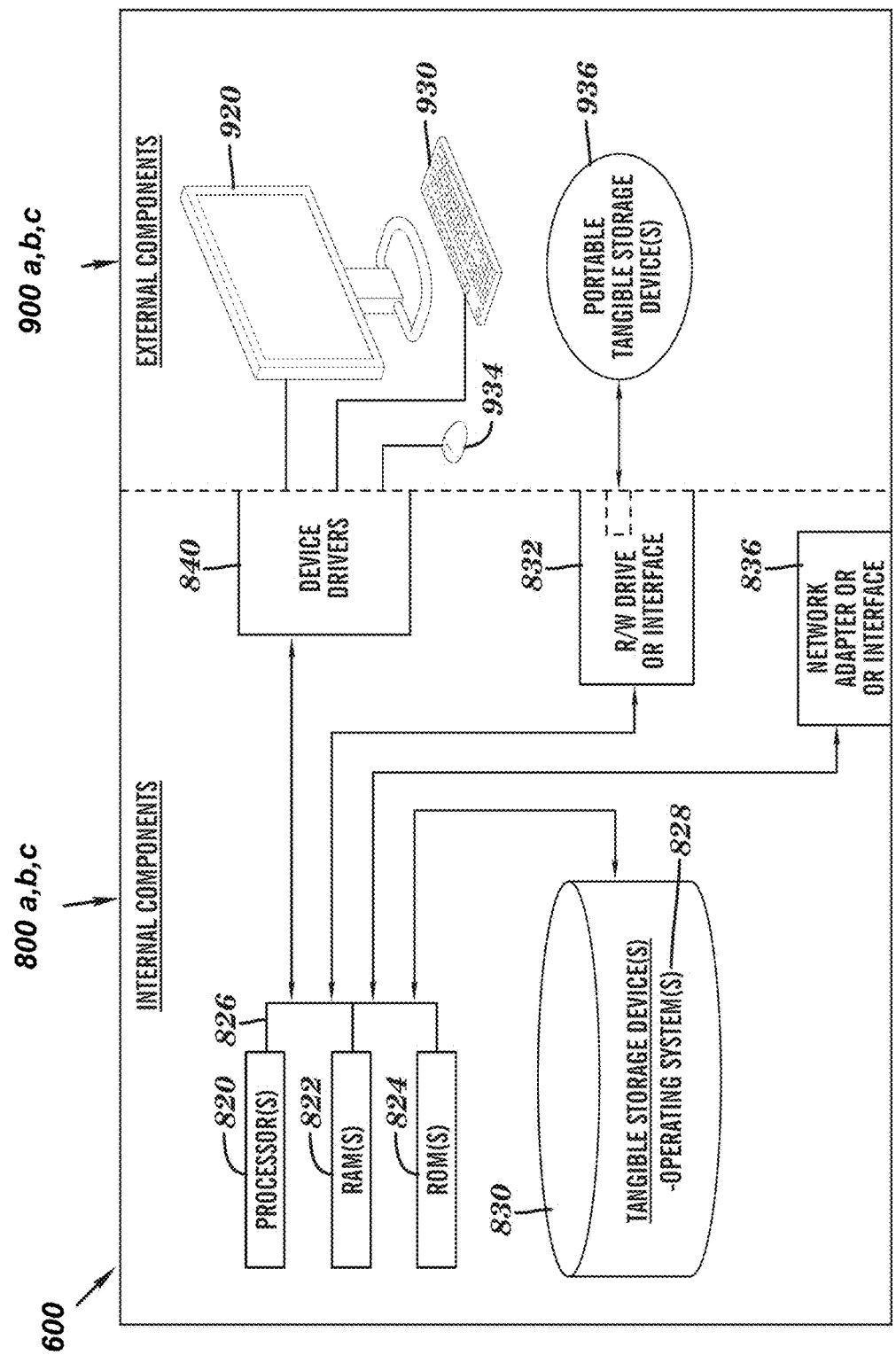
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102A, 102B (FIG. 1) and network server 114 (FIG. 1) may include respective sets of internal components 800 a,b,c and external components 900 a,b,c illustrated in FIG. 6. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Boundless Projected Interactive Virtual Desktop program 108A, 108B (FIG. 1) in client computer 102A, 102B (FIG. 1) and network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Boundless Projected Interactive Virtual Desktop program 108A, 108B (FIG. 1) can be stored on one or more of the respective portable computer-readable tangible storage devices 936, read via the respective R/W drive or interface 832 and loaded into the respective hard drive 830.

Each set of internal components 800 a,b,c also includes network adapters or interfaces 836 such as a TCP/IP adapter cards, wireless Wi-Fi interface cards, or 3G or 4G wireless interface cards or other wired or wireless communication links. The Boundless Projected Interactive Virtual Desktop program 108A, 108B (FIG. 1) in client computer 102A, 102B (FIG. 1) and network server 114 (FIG. 1) can be downloaded to client computer 102A, 102B (FIG. 1) and network server 114 (FIG. 1) from an external computer via a network (for example, the Internet, a local area network or other, wide area network) and respective network adapters or interfaces 836. From the network adapters or interfaces 836, the Boundless Projected Interactive Virtual Desktop program 108A, 108B (FIG. 1) in client computer 102A, 102B (FIG. 1) and network server 114 (FIG. 1) is loaded into the respective hard drive 830. The network may comprise copper wires, optical fibers, wireless transmission, routers, firewalls, switches, gateway computers and/or edge servers.

Each of the sets of external components 900 a,b,c can include a computer display monitor 920, a keyboard 930, and a computer mouse 934. External components 900 a,b,c can also include touch screens, virtual keyboards, touch pads, pointing devices, and other human interface devices. Each of the sets of internal components 800 a,b,c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating a boundless projected interactive virtual desktop, wherein the boundless projected interactive virtual desktop comprises an adjustable image of a projected portion of an area associated with at least one desktop of a computing device, the method comprising:
   integrating a projector and a motion sensor into a device;
   capturing at least one of a location, a change in location, a change in direction, or a change in orientation associated with the device from the integrated motion sensor;
   computing a projected image based on the captured location, the captured change in direction, or the captured change in orientation of the device relative to a projected surface;
   coordinating the computed projected image across at least one application running in the device based on the captured location and an orientation of the projector, wherein the projected image is associated with the projection surface;
   projecting a view of a portion of an area associated with the coordinated projected image, wherein the projected view comprises an interactive virtual desktop including a plurality of elements comprising application images; and
   adjusting the projected view of the portion of the area based on a criteria, wherein adjusting the projected view comprises projecting a smaller portion of the projected view when a battery conservation is determined to be critical for a light source associated with the projection surface, and wherein the projected smaller portion of the projected view maintains a size of a plurality of elements associated with an originally projected view.

2. The method of claim 1, wherein the criteria comprises a plurality of rules based on at least one of a power consumption; a distance to a projection surface; a motion; an image fidelity; an outside light or an ambient light; a tilt or an angle of the device relative to the surface; and information received from at least one other device.

3. The method of claim 1, wherein the plurality of elements are selected from a group consisting of at least one of a document; an image; a folder; a video; a web browser tab; an application window; and an application icon.

4. The method of claim 1, further comprising:
   adjusting a strength associated with the projected view based on a distance of the projector to the projection surface.

5. The method of claim 1, wherein the motion sensor is selected from a group consisting of at least one of an embedded accelerometer; a gyroscope; a positioning system including an autofocus system; and an embedded or external electromagnetic or ultrasonic motion sensor.

6. The method of claim 1, wherein the projected view preserves a position and size of at least one element within the plurality of elements in the bounded projection relative to the projection surface by making adjustments to a calculation associated with the projected view.

7. The method of claim 1, further comprising:
   providing a user interface (UI) associated with the projected interactive virtual desktop, wherein the user interface (UI) allows at least two users to act on at least one element within the plurality of elements independently wherein the first user is on a first device and the second user is on a second device and wherein a combination of a projected area associated with the first device and a projected area associated with the second device reveals a contiguous image and a larger image of the portion of the area associated with the projected image than the first device or the second device could reveal in isolation of one another.

8. The method of claim 7, wherein the user interface (UI) associated with the projected interactive virtual desktop supports at least one gesture selected from a group consisting of at least one of a drag; a pick up; a drop; a pin; and a navigate.

9. The method of claim 1, wherein the adjusted projected view is based on a detected change in movement associated with the device and the adjusted projected view reveals a previously unrevealed portion of the projected image.

* * * * *